(12) United States Patent
Terao

(10) Patent No.: US 8,175,868 B2
(45) Date of Patent: May 8, 2012

(54) VOICE JUDGING SYSTEM, VOICE JUDGING METHOD AND PROGRAM FOR VOICE JUDGMENT

(75) Inventor: Makoto Terao, Tokyo (JP)

(73) Assignee: NEC Corporation, Tokyo (JP)

( * ) Notice: Subject to any disclaimer, the term of this patent is extended or adjusted under 35 U.S.C. 154(b) by 1021 days.

(21) Appl. No.: 12/090,043

(22) PCT Filed: Oct. 10, 2006

(86) PCT No.: PCT/JP2006/320199
§ 371 (c)(1),
(2), (4) Date: Apr. 11, 2008

(87) PCT Pub. No.: WO2007/046267
PCT Pub. Date: Apr. 26, 2007

(65) Prior Publication Data
US 2009/0138260 A1    May 28, 2009

(30) Foreign Application Priority Data
Oct. 20, 2005    (JP) .................................. 2005-305625

(51) Int. Cl.
*G10L 11/06* (2006.01)
(52) U.S. Cl. ........................................ 704/214; 704/208
(58) Field of Classification Search .......... 704/207–210, 704/214, 215, 251–257
See application file for complete search history.

(56) References Cited

U.S. PATENT DOCUMENTS

| 3,679,830 | A | * | 7/1972 | Uffelman et al. | 704/215 |
| 4,920,568 | A |  | 4/1990 | Kamiya et al. | |
| 4,979,212 | A | * | 12/1990 | Yamada et al. | 704/234 |
| 5,349,645 | A | * | 9/1994 | Zhao | 704/243 |
| 5,611,019 | A | * | 3/1997 | Nakatoh et al. | 704/233 |
| 5,664,052 | A | * | 9/1997 | Nishiguchi et al. | 704/214 |
| 5,893,058 | A | * | 4/1999 | Kosaka | 704/254 |
| 6,226,606 | B1 | * | 5/2001 | Acero et al. | 704/218 |
| 6,275,795 | B1 | * | 8/2001 | Tzirkel-Hancock | 704/214 |
| 6,285,979 | B1 | * | 9/2001 | Ginzburg et al. | 704/208 |
| 2002/0184009 | A1 | * | 12/2002 | Heikkinen | 704/219 |
| 2004/0049380 | A1 |  | 3/2004 | Ehara et al. | |
| 2006/0004567 | A1 | * | 1/2006 | Russell | 704/209 |

FOREIGN PATENT DOCUMENTS

JP        62-17800        1/1987

(Continued)

OTHER PUBLICATIONS

S. Furui, "Digital Speech Processing," published by Tokai University Publishing Section, 1985, p. 40.

(Continued)

*Primary Examiner* — Abul Azad
(74) *Attorney, Agent, or Firm* — Dickstein Shapiro LLP

(57) ABSTRACT

A voice judging system including feature value extraction means that analyzes a sound signal input from a sound signal input device, and extracts a time series of the feature values, sub-word boundary score calculating means that calculates a time series of sub-word boundary scores, by having reference to sound models of voice stored in a voice model storage unit, temporal regularity analyzing means that analyzes temporal regularity of the sub-word boundary scores, and voice judgment means judges whether the input sound signal is voice or non-voice using of the temporal regularity of the sub-word boundary scores.

11 Claims, 8 Drawing Sheets

FOREIGN PATENT DOCUMENTS

| | | |
|---|---|---|
| JP | 5-173592 | 7/1993 |
| JP | 6-266387 | 9/1994 |
| JP | 2797861 | 7/1998 |
| JP | 10-254476 | 9/1998 |
| JP | 2002-6874 | 1/2002 |
| JP | 2002-236495 | 8/2002 |

OTHER PUBLICATIONS

N. Takaya, "Digital Signal Processing," published by Shokoh-Do, 1997, pp. 96-99.

* cited by examiner

VOICE JUDGING SYSTEM, VOICE JUDGING METHOD AND PROGRAM FOR VOICE JUDGMENT

TECHNICAL FIELD

This invention relates to a voice judging system, a voice judging method and a program for voice judgment. More particularly, this invention relates to a voice judging system, a voice judging method and a program for voice judgment, used for distinguishing between voice and non-voice in a sound signal.

BACKGROUND ART

As a conventional voice judging system of this sort, there is disclosed in Patent Publication 1, for example, a configuration herein shown in FIG. 8. Referring to FIG. 8, this conventional voice judging system includes sound signal input means 810, feature value extracting means 821, sound score calculating means 824, likelihood ratio calculating means 822, voice judging means 823, a voice model memory 831 and a non-voice model memory 832. The operation of the conventional voice judging system, shown in FIG. 8, will be described briefly.

From the sound signal input by the sound signal input means 810, feature is analyzed by the feature value extracting means 821. As features, cepstrum based on LPC (Linear Predictive Coefficient) analysis and its first-order differential with respect to time, are used. The cepstrum is a feature representing the property of the sound signal in the frequency domain, that is, the shape of the log spectral envelope. The analysis of the feature is performed for a blocked frame which is blocked every 32 msec, for instance.

The sound score calculating means 824 calculates, for the feature derived by the feature value extracting means 821, likelihood for a voice model stored in the voice model memory 831, and likelihood for a non-voice model stored in the non-voice model memory 832.

Meanwhile, the voice model and the non-voice model are trained in advance using a voice signal and a non-voice signal, respectively. As these models, may be used, for example, HMMs (Hidden Markov Models).

The likelihood ratio calculating means 822 calculates the ratio of the likelihood of voice model to that of non-voice model which have been acquired by the sound score calculating means 824.

When an interval, for which the likelihood ratio calculated by the likelihood ratio calculating means 822, exceeds a preset threshold value, continues for a preset time, the voice judging means 823 determines the interval to be a voiced interval.

With this conventional voice judging system, voice and non-voice models, in which the cepstrum, representing the property in the frequency domain of a sound signal, is used as a feature, are provided, and the likelihood of the voice model is compared with that of the non-voice model for each frame. Thus, the system enables voice judgment which is robust to some extent against noise.

There is shown in Patent Publication 2 the configuration of a voice decoding device for distinguishing a stationary signal exhibiting the periodicity from a white-noise-like steady noise signal to enable an interval of the stationary noise signal to be detected accurately. This system analyzes the period of the voice signal in a sub-frame and decides a signal exhibiting strong periodicity to be not a stationary noise interval because such signal is highly likely to be a stationary vowel, other than the noise, for instance. A pitch log analyzer shown in this Patent Publication 2 analyzes the variations in the pitch period input from an adaptive codebook, on each sub-frame, and detects vowel-likeness of the signal, in order to determine whether or not the signal is a voice signal. That is, in Patent Publication 2, the period of the voice signal in a sub-frame corresponds to the period (3 to 10 msec) of a voice waveform for a vowel. In a configuration disclosed in Patent Publication 3, sound parameters, such as 18 order LPC cepstrum, number of zero-crossings or power, are extracted from voice data, and the vowels are detected based on the sound parameters and the standard vowel patterns stored in a standard vowel pattern storage unit. Hypotheses are generated, as the dictionary grammar storage unit is searched in the order of vowels and consonants, based on the results of recognition. The scores (likelihood) of consonants are derived from one hypothesis to another, and characters are selected based on the scores to generate character string data.

Patent Document 1: JP Patent Kokai JP-A-10-254476
Patent Document 2: JP Patent Kokai JP-A-2002-236495
Patent Document 3: JP Patent Kokai JP-A-06-266387
Non-Patent Document 1: S. Furui, 'Digital Speech Processing', published by TOKAI UNIVERSITY Publishing Section, 1985, p. 40
Non-Patent Document 2: N. Takaya, 'Digital Signal Processing', published by SHOKOH-DO, 1997, pp. 96-99

DISCLOSURE OF THE INVENTION

In the voice judging system, described with reference to FIG. 8, there is a problem that a noise from which a feature close to that of voice, is obtained by temporally localized analysis, that is, the noise locally exhibiting the property similar to that of the voice, is erroneously determined to be a voice signal. The reason this problem is caused will be described in the below.

In the conventional voice judging system, the feature used for voice or non-voice models, such as cepstrum, is analyzed in general for a time duration shorter than that of a constituent unit of the voice, such as a phoneme or syllable. For example, the feature is obtained by analyses of a blocked frame of shorter time duration of the order of tens of msec. That is, the feature, such as cepstrum, may be said to represent a temporally localized property in the sound signal.

However, among noises, there are many from which, as a result of localized analysis, there may be obtained a feature very close to that obtained from a voice. For example, it occurs frequently that analysis of the noise locally sliced out yields the feature close to that of the phoneme /a/ or /s/, which is a voice.

Thus, the conventional voice judging system, which compares the likelihood of voice with that of noise on the frame basis, may give an erroneous decision that a noise for which may be obtained the feature close to that of voice by localized analysis is a voice.

Patent Publication 2 discloses a configuration for detecting the periodicity on the level of a signal waveform proper to a vowel. Since this method discriminates the voice based on the local feature proper to the vowel, there exists the same problem that a noise locally exhibiting the feature close to that of voice may be erroneously determined to be a voice signal. In Patent Publication 3, which derives the vowel-likeness from a sound model, there is not described the recognition of the problem that a noise exhibiting the characteristic similar to that of a voice tends to be erroneously determined to be the voice.

In view of the problems of the above described related arts, it is a principal object of the present invention to provide a system and a method for voice judgment, as well as a computer program, according to which, a noise from which a feature close to that of voice may be obtained by temporally localized analysis, may correctly be determined to be non-voice.

Problem to be Solved by the Invention

To solve the above problem, the invention disclosed in the present application may be summarized substantially as follows:

A voice judging system (apparatus), according to the present invention, comprises: a voice model memory in which are stored a plurality of sound models of voice, a vowel score calculating means that calculates vowel scores, representing vowel-likeness, for respective time points of an input sound signal, by having reference to the sound models, a temporal regularity analyzing means that analyzes the temporal regularity of the vowel scores, and a voice judging means that determines whether the input sound signal is voice or non-voice, using the temporal regularity of the vowel scores.

A voice judging system (apparatus), according to the present invention, comprises a voice model memory in which are stored a plurality of sound models of voice, a sub-word boundary score calculating means that calculates sub-word boundary scores, representing sub-word-boundary-likeness, for respective time points of an input sound signal, by having reference to the sound models, a temporal regularity analyzing means that analyzes the temporal regularity of the sub-word boundary scores, and a voice judging means that determines whether the input sound signal is voice or non-voice, using the temporal regularity of the sub-word boundary scores.

A voice judging method, according to the present invention, comprises a step of a voice judging apparatus calculating vowel scores, representing vowel-likeness, for respective time points of the input sound signal, by having reference to a plurality of sound models stored in a voice model memory, a step of the voice judging apparatus analyzing the temporal regularity of the vowel scores, and a step of the voice judging apparatus judging whether the input sound signal is voice or non-voice, using the temporal regularity of the vowel scores.

A voice judging method, according to the present invention, comprises a step of a voice judging apparatus calculating sub-word boundary scores, representing sub-word-boundary-likeness, for respective time points of the sound input signal, by having reference to a plurality of sound models stored in a voice model memory, a step of the voice judging apparatus analyzing the temporal regularity of the sub-word boundary scores, and a step of the voice judging apparatus judging whether the input sound signal is voice or non-voice, using the temporal regularity of the sub-word boundary scores.

A computer program, according to the present invention, is constituted by a program causing a computer to execute:

a vowel score calculating processing that calculates vowel scores, representing vowel-likeness, for respective time points of an input sound signal, by having reference to a plurality of sound models stored in a voice model memory, a temporal regularity analyzing processing that analyzes the temporal regularity of the vowel scores, and a voice judging processing that determines whether the input sound signal is voice or non-voice, using the temporal regularity of the vowel scores.

A computer program, according to the present invention, is constituted by a program causing a computer to execute:

a sub-word boundary score calculating processing that calculates sub-word boundary scores, representing sub-word-boundary-likeness, for respective time points of an input sound signal, by having reference to a plurality of sound models stored in a voice model memory, a temporal regularity analyzing processing that analyzes the temporal regularity of the sub-word boundary scores, and a voice judging processing that determines whether the input sound signal is voice or non-voice, using the temporal regularity of the sub-word boundary scores.

MERITORIOUS EFFECT OF THE INVENTION

According to the present invention, a noise from which a feature close to that of voice may be obtained by temporally localized analysis, may correctly be determined to be non-voice, through analysis on the periodicity of the voice based on linguistic property of voice, that is, through analysis on the periodicity of syllabic structure thereof.

Figure 1:
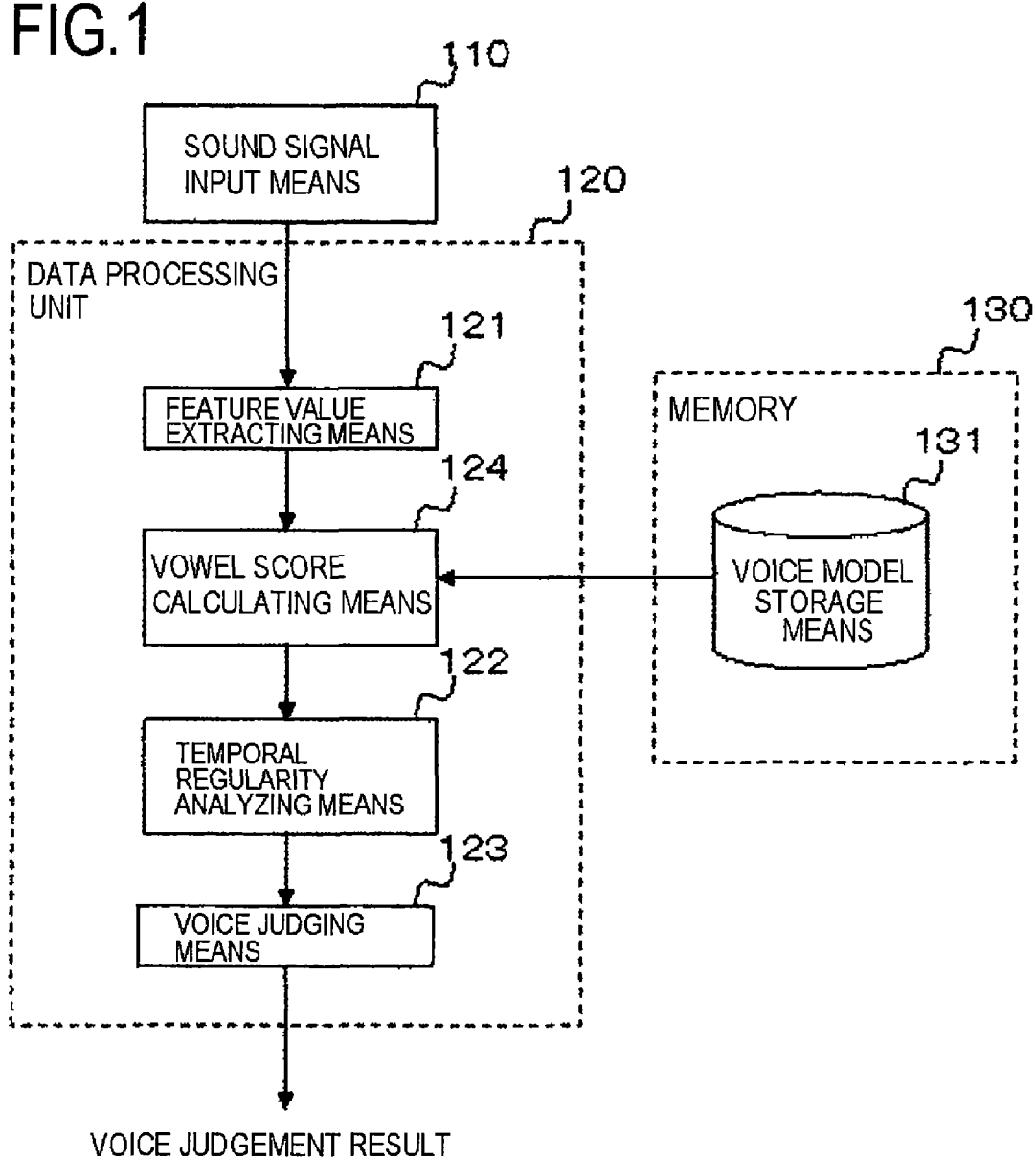
FIG. 1 is a schematic block diagram showing the configuration of a first embodiment of the present invention.

EXPLANATION OF NUMERALS 110 sound signal input means
120 data processing unit
121 feature value extracting means
122 temporal regularity analyzing means
123 voice judging means
124 vowel score calculating means
130 memory
131 voice model storage means
410 sound signal input means
420 data processing unit
421 feature value extracting means
422 temporal regularity analyzing means
423 voice judging means
424 sub-word boundary score calculating means
430 memory
431 voice model storage means
710 input device
720 data processing unit
730 memory 731 voice model storage unit
740 output device
750 program for voice judgment
810 sound signal input means
821 feature value extracting means
822 likelihood ratio calculating means
823 voice judging means
824 sound score calculating means
831 voice model storage means
832 non-voice model storage means

BEST MODE FOR CARRYING OUT THE INVENTION

Reference is now made to the accompanying drawings for illustrating the present invention in further detail. It should be noted that reference numerals or symbols in parentheses are used in the following description to help understand the configuration of the present invention, and are not to be construed in the sense of restricting the present invention.

A first voice judging system according to the present invention includes voice model storage means (131 of FIG. 1) in which are stored a plurality of sound models for vowels or phonemes inclusive of vowels, vowel score calculating means (124 of FIG. 1) that calculates vowel scores, representing vowel-likeness, for respective time points of the input sound signal, by having reference to the sound models, temporal regularity analyzing means (122 of FIG. 1) that analyzes the temporal regularity of the vowel scores from time series data of the vowel scores, and voice judging means (123 of FIG. 1) that judges whether the input sound signal is voice or non-voice, based on presence or non-presence of temporal regularity of time series data of the vowel scores.

The voice judging means (123 of FIG. 1) judges the input sound signal to be voice in case the vowel scores exhibit temporal regularity, and judges the input sound signal to be non-voice in case the vowel scores fail to exhibit temporal regularity. By such configuration, even a noise from which a feature close to that of voice is obtained by temporally localized analysis may correctly be determined to be non-voice.

In a second voice judging system according to the present invention, sub-word based sound models, such as the models for phonemes or syllables, are stored in the voice model storage means (131 of FIG. 1) in the configuration of the above-described first voice judging system and there is provided sub-word boundary score calculating means (424 of FIG. 4) that calculates the sub-word boundary scores, representing sub-word-boundary-likeness (phoneme-boundary-likeness or syllabic-boundary-likeness) for respective time points of the input sound signal, by having reference to the sub-word-based sound models, in place of the vowel score calculating means (124 of FIG. 1) in the configuration of the above-described first voice judging system. The second voice judging system is otherwise similar to the above-described first voice judging system. When the time series of the sub-word boundary scores exhibits the temporal regularity, the second voice judging system judges the input sound signal to be a voice signal. Conversely, when the time series of the sub-word boundary score fails to exhibit the temporal regularity, the second voice judging system judges the input sound signal to be a non-voice signal. By this configuration, a noise which on temporally localized analysis may yield a feature close to that of voice may correctly be determined to be non-voice.

In the present invention, a time series of vowel scores, representing vowel-likeness, or a time series of the sub-word scores, representing sub-word-boundary-likeness, is derived, with the use of sound models of voice, as described above. The input sound signal is determined to be voice in case the time series of the scores derived exhibits the temporal regularity, that is, the periodicity, and is determined to be non-voice in case the time series of the scores derived fails to exhibit the temporal regularity.

In general, a voice signal has the property that sub-words, such as phonemes or syllables, occur with temporal regularity.

In the case of a voice signal, sub-words, such as phonemes or syllables, changes in succession, and in general, the time interval of the change of sub-words is within a range of tens of msec to hundreds of msec.

On the other hand, in the case of a non-voice signal, such as noise, it is only rare that signals close to various species of sub-words occur in quick succession, with the time intervals of tens to hundreds of msec, even granting that a feature close to that of the phonemes or syllables may sometimes occur as a result of temporally localized analysis.

Hence, the property that a large variety of sub-word species occur with temporal regularity in quick succession may be said to be innate to the voice signal.

According to the present invention, the periodicity (regularity) derived based upon linguistic property of the voice is analyzed in order to take up the above property peculiar to the voice. Viz., it is determined whether or not time series data of vowel scores, representing vowel-likeness, or that of sub-word boundary scores, representing sub-word-boundary-likeness, exhibits the temporal regularity. In case the time series data exhibits the temporal regularity, the input sound signal is determined to be voice.

With the non-voice signal, it is only rare that the vowel scores or the sub-word boundary scores exhibit temporal regularity. Therefore, even the noise that yields the feature close to that of voice on temporally localized analysis may correctly be determined to be non-voice.

To correctly take up the property specific to the voice signal that a variety of sub-word species occur in quick succession with temporal regularity, it is necessary to derive the vowel scores or the sub-word boundary scores to high accuracy. According to the present invention, in which the sound models of voice, such as those of phonemes or syllables, are used, it is possible to calculate those scores to high accuracy. The present invention will now be described with reference to examples.

EXAMPLES

FIG. 1 is a block diagram illustrating a first example of the present invention. Referring to FIG. 1, the first example of the present invention, shown in FIG. 1, includes a sound signal input means 110, a data processing unit 120 and a memory 130 for storing information.

The memory 130 includes a voice model storage means 131. In this voice model storage means 131, there are stored sound models for vowels or phonemes inclusive of vowels.

The data processing unit 120 includes a feature value extracting means 121, a vowel score calculating means 124, a temporal regularity analyzing means 122 and a voice judging means 123.

The feature value extracting means 121 analyzes a sound signal, input from the sound signal input means 110 and extracts a time series of feature values.

A vowel score calculating means 124 refers to the sound models, stored in the voice model storage means 131, and calculates the vowel scores with respect to the feature values at respective time points extracted by the feature value extracting means 121.

The temporal regularity analyzing means 122 analyzes the temporal regularity of the vowel scores obtained by the vowel score calculating means 124.

The voice judging means 123 determines whether the input sound signal is voice or non-voice, based on presence or non-presence of the temporal regularity of the vowel scores.

It should be noticed that the functions or processing operations of respective means in the data processing unit 120, that is, the feature value extracting means 121, vowel score calculating means 124, temporal regularity analyzing means 122 and the voice judging means 123, may be implemented by a program executed on the data processing unit 120 (computer). See a third example hereinbelow.

Figure 2:
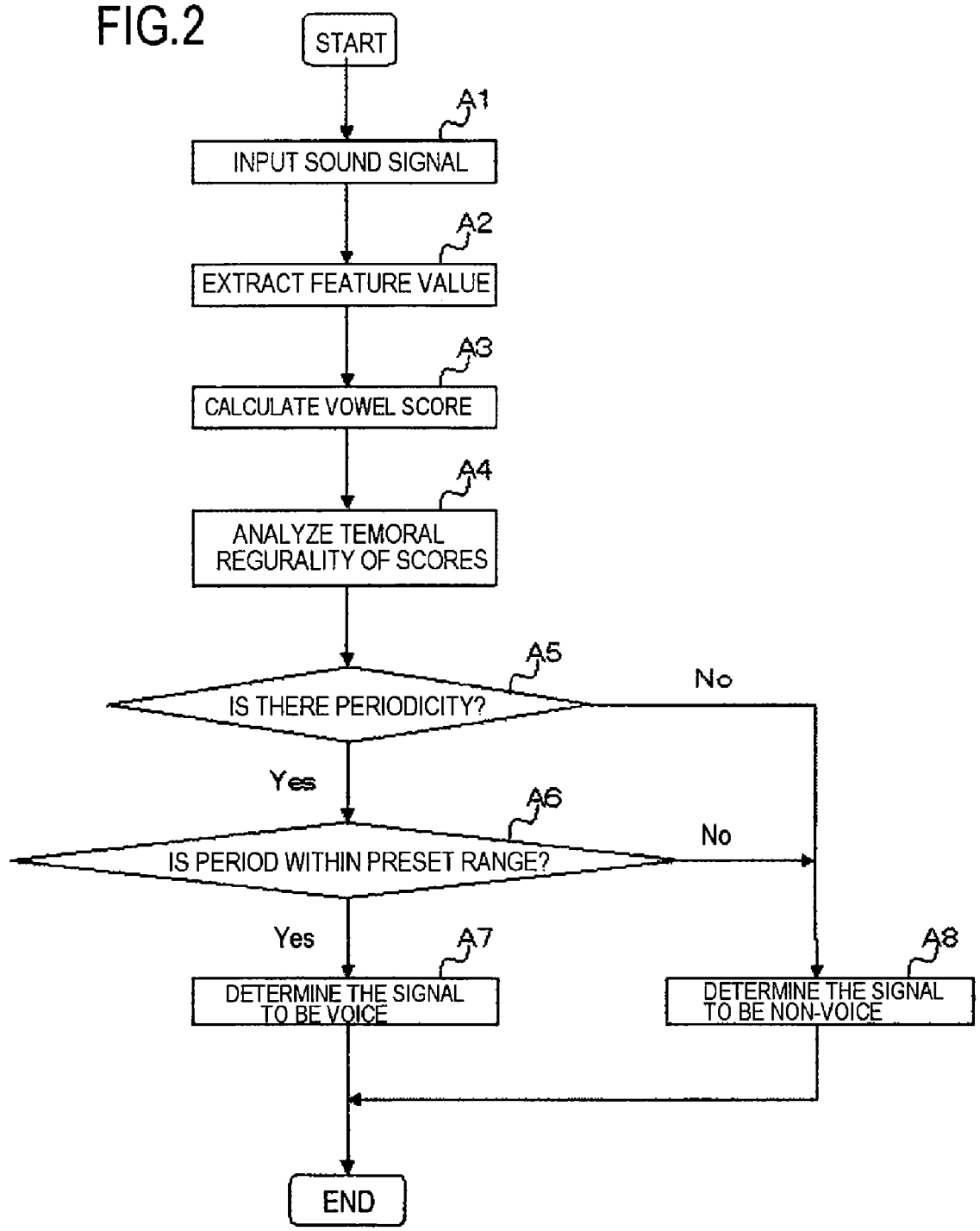
FIG. 2 is a flowchart showing the operation of the first example of the present invention.

FIG. 2 is a flowchart for illustrating the processing sequence of the first example of the present invention. The overall operation of the present example is now described in detail with reference to FIG. 1 and the flowchart of FIG. 2.

Initially, a sound signal is input to the system by the sound signal input means 110 (step A1 of FIG. 2).

The voice may be input in real-time by a microphone, for example, or a sound signal recorded beforehand on a recording medium, such as a hard disc or a tape, may also be input.

The feature value extracting means 121 analyzes the input sound signal, and extracts a time series of features useful for expressing the shape of the spectrum of the sound signal (step A2 of FIG. 2).

The feature is analyzed for every time unit called a 'frame'. The duration of each frame may, for example, be on the order of tens of msec.

The MFCC (Mel-scale Frequency Cepstral Coefficients) may also be used as the feature. The MFCC is the feature that expresses an envelope of the log frequency spectrum, in which the psychosound characteristics of the human being are taken into account. It is frequently used in voice recognition, for example.

In the voice model storage means 131, there are stored sound models for vowels or phonemes inclusive of vowels. The sound models, stored in the voice model storage means 131, are HMMs (Hidden Markov Models) or GMMs (Gaussian Mixture Models), frequently used in the field of voice recognition. In these models, there are learned the vowels or phonemes inclusive of the vowels by voice signals.

The vowel score calculating means 124 refers to the sound models, stored in the voice model storage means 131, to calculate vowel scores with respect to the feature at respective time points, that is, the time series of features extracted by the feature value extracting means 121 (step A3 of FIG. 2).

The vowel score is a measure of the vowel-likeness of the input sound signal. This vowel score may be derived by the following method, using the sound models for the vowels or phonemes, inclusive of the vowels.

That is, if the sound model, stored in the voice model storage means 131, is a model for the vowel, the likelihood of the vowel model for the feature may directly be used as the vowel score.

If the sound model, stored in the voice model storage means 131, is a model for a phoneme, the likelihood of the model for the vowel, such as /a/, /i/, /u/, /e/ or /o/, may be summed to the likelihood of the model for the phoneme, and the resulting sum may then be used as a vowel score.

In case the sound model stored in the voice model storage means 131 contains a phoneme other than a vowel, such as a consonant, the a-posteriori probability of the vowel, calculated in accordance with the following equation (1):

$$P(q \in S_{vowel} | x) = \frac{\sum_{q \in S_{vowel}} P(x|q)}{\sum_{q \in S_{all}} P(x|q)} \quad (1)$$

may be used as the vowel score.

In the above equation (1), x is feature value;

q is phoneme;

p(x|q) is likelihood of the model of a phoneme q; and p(q|x) is a-posteriori probability of the phoneme q.

In addition, S_all denotes a set of all phonemes stored in the voice model storage means 131, and S_vowel denotes a set of the vowels included in S_all.

Hence, the denominator of the right side of the above equation (1) is the sum of the values of the likelihood of all phoneme models, while the numerator of the right side is the sum of the values of the likelihood of the phoneme models for the vowels.

The normalized vowel score may be obtained by calculating the a-posteriori probability of the vowel in accordance with the equation (1).

The time series of the vowel scores, calculated as thus far described, may be thought of as indicating the degree of vowel-likeness at respective time points of the input sound signal.

Figure 3:
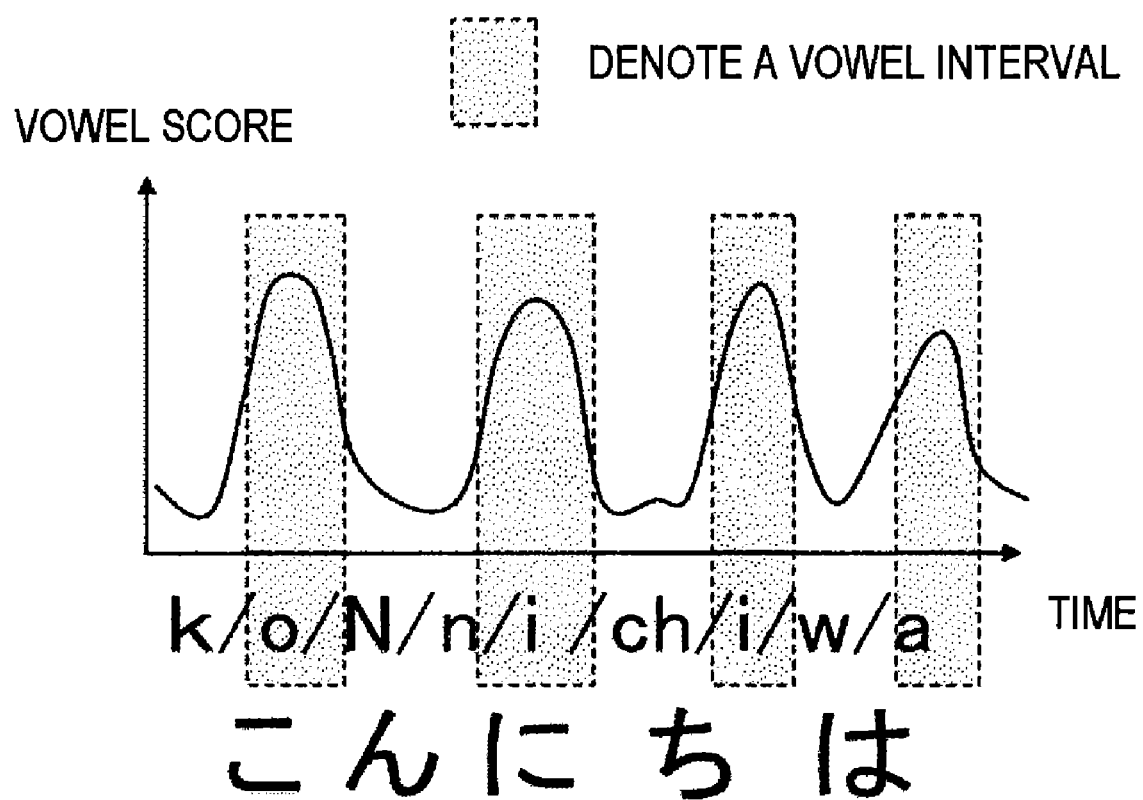
FIG. 3 is a graph schematically showing a time series of vowel scores for the voice "konnichiwa" in the first example of the present invention.

FIG. 3 is a graph showing a time series of vowel scores as found for the voice "konnichiwa" (k/o/N/n/i/ch/i/w/a/). In FIG. 3, the abscissa and the ordinate denote the time and the vowel scores, respectively. In FIG. 3, a solid line indicates the time series of the vowel scores and rectangular areas each denote a vowel interval.

In general, the voice has the property that the vowels occur periodically at a substantially constant time interval. Hence, the time series of the vowel scores for the voice exhibits temporal regularity as shown in FIG. 3.

Conversely, with the non-voice, the vowel-like intervals occur periodically only on extremely rare occasions. It is therefore only rare that the time series of the vowel scores for the non-voice exhibits temporal regularity such as shown in FIG. 3.

The temporal regularity analyzing means 122 then analyzes the temporal regularity of the vowel scores derived by the vowel score calculating means 124 (step A4 of FIG. 2). For this analysis, the autocorrelation analysis, for example, may be used. That is, the presence or non-presence of a peak in the autocorrelation function, as well as the peak position, obtained by autocorrelation analysis of the time series of the vowel scores, may be investigated to determine whether or not the vowel scores exhibit periodicity, as well as to obtain the value of the period if the vowel scores exhibit periodicity. Meanwhile, the in-depth description of the autocorrelation analysis may be found in Non-Patent Publication 1.

As another method for analyzing the periodicity of the vowel scores, discrete Fourier transform may also be used. The discrete Fourier transform of the time series of the vowel scores renders it possible to determine whether or not the vowel scores exhibit the periodicity and to find the value of the period in case the vowel scores exhibit the periodicity. Regarding the detailed description of the discrete Fourier transform, reference may be done to Non-Patent Publication 2.

It is necessary to select a window width for the autocorrelation analysis or the analysis by discrete Fourier transform so that vowels occur several times or more frequently in the so selected window of the voice signal.

The reason is that, by analyzing the temporal regularity of the vowel scores with the window of a time duration such that vowels occur several times or more frequently therein, it becomes possible to extract the property proper to the voice that the vowels occur periodically, that is, at a substantially constant time interval.

It is thus preferred that the window length for autocorrelation analysis or discrete Fourier analysis is set so as to be not less than 100 msec, for instance.

The voice judging means 123 determines whether the input sound signal is voice or non-voice, based on the presence or the non-presence of temporal regularity of the vowel scores.

That is, the voice judging means determines whether or not the vowel scores exhibit temporal regularity (step A5 of FIG. 2). In case the vowel scores exhibit temporal regularity, the voice judging means decides that the input sound signal is highly likely to be a voice signal. If the vowel scores fail to exhibit temporal regularity, it decides that the input sound signal is a non-voice signal (step A8 of FIG. 2).

In case it has been decided that the vowel scores exhibit temporal regularity, it is further decided whether or not the period is within a preset range (step A6 of FIG. 2). In case it has been decided that the period is within the preset range, the input sound signal is determined to be a voice signal (step A7 of FIG. 2), and, in case it has been decided that the period is not within the preset range, the input sound signal is determined to be a non-voice signal (step A8 of FIG. 2).

Meanwhile, the decision on whether or not the period is within the preset range (step A6 of FIG. 2) may be dispensed with, such that it is possible to distinguish between the voice and the non-voice based only on a decision on whether or not the vowel scores exhibit the temporal regularity (step A5 of FIG. 2).

It is noted that the range of the time period of the vowel scores for giving a decision in the step A6 of FIG. 2 that the input sound signal is the voice corresponds to the ordinary syllabic period in voice. Hence, the range of the time period of the vowel scores for giving the decision that the input sound signal is the voice is 50 msec to 300 msec, for instance.

The operation and the meritorious effect of the present example are now described.

With the present example, if the vowel scores, representing vowel-likeness of the sound signal, exhibit the temporal regularity, the input sound signal is determined to be a voice signal and, if otherwise, the input sound signal is determined to be a non-voice signal.

Hence, a noise, from which the feature close to that of a voice may be obtained by temporally localized analysis, may correctly be determined to be non-voice.

In general, the voice signal exhibits the property that the vowels occur in an orderly manner at a substantially constant time interval. With the non-voice signal, there may be such a noise from which a feature close to that of voice may be obtained by temporally localized analysis. However, it is only rare that, even with those noises, the intervals exhibiting the properties close to those of the vowels occur with temporal regularity comparable to that of the voice signal.

With the present example, the presence or the non-presence of the temporal regularity of the vowel scores is decided and, in case the vowel scores exhibit temporal regularity, a decision is given that the input sound signal is a voice signal. It is thus possible to take up and exploit the property which is specific to voice.

Thus, with the present example, such noise that yields a feature close to that of voice by temporally localized analysis may correctly be determined to be non-voice.

The point of difference of the aforementioned Patent Publication 2 from the present example is now explained. In this Patent Publication 2, the period of a signal in a sub-frame is analyzed to determine whether or not the interval is a stationary noise interval, and the signal that exhibits strong periodicity is decided not to be the stationary noise interval because such signal is highly likely to be a stationary vowel, for instance. However, the period of the signal in the sub-frame is of the order of 3 to 10 msec which is the period of the vocal cord oscillation. In Patent Publication 2, only the periodicity on the signal level of the signal waveform per se proper to the vowel is captured. Therefore, a sound that may appear to be like a vowel may be identified. However, it is not possible with Patent Publication 2 to correctly determine that a noise from which a feature close to that of voice may be locally obtained is actually a non-voice signal.

On the other hand, with the first example of the present invention, it is determined whether the input sound signal is voice or non-voice, based on the periodicity of the vowel scores. It is noted that, in FIG. 3, the period of the vowels o, i, i and a is on the order of 100 to 200 msec. According to the present invention, the syllabic structure of a consistent voice is captured as the period. In a voice, consonants and vowels occur repeatedly. When the vowel-likeness is expressed in a time series, one may notice the periodicity in the time series corresponding to that of transition from one syllable to another. Thus, with the present example, in which the periodicity based on the linguistic feature of voice is detected, it becomes possible to distinguish between voice and non-voice with high accuracy even in such case where an input sound signal may appear to be a voice on a signal level but in actuality is not the voice.

Figure 4:
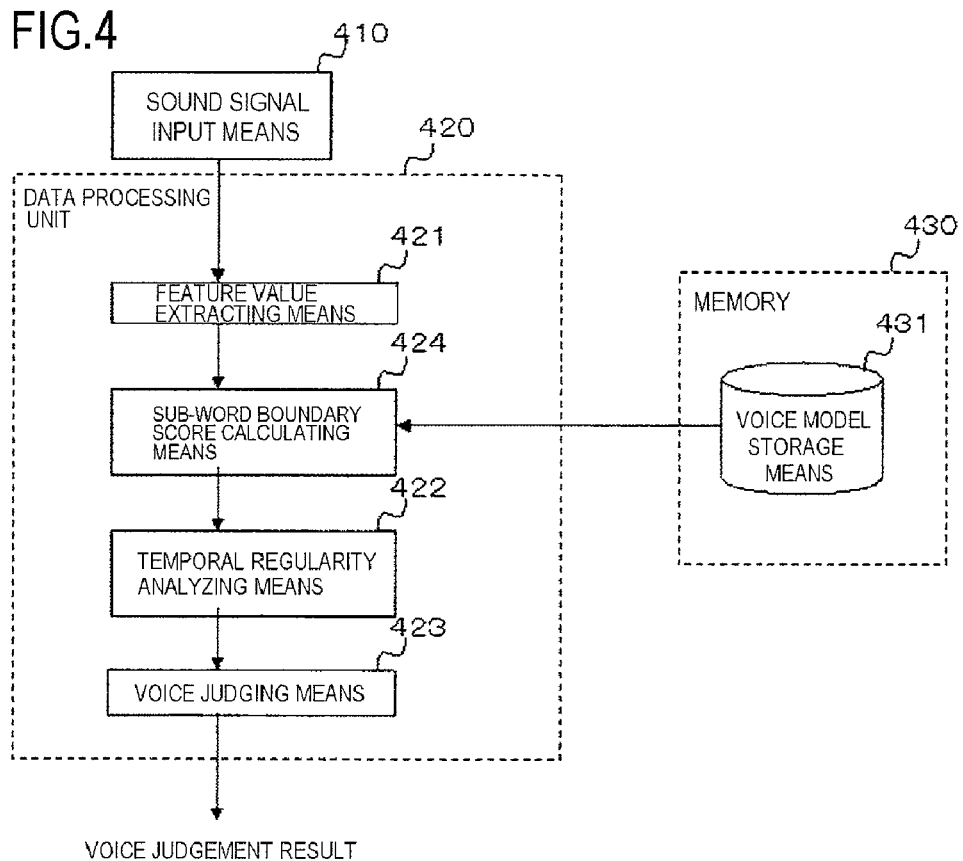
FIG. 4 is a schematic block diagram showing the configuration of a second example of the present invention.

A second example of the present invention is now described. FIG. 4 is a diagram illustrating the configuration of the second example. Referring to FIG. 4, the present second example includes sound signal input means 410, a data processing unit 420 and a memory 430 for storing information.

The memory 430 includes a voice model storage means 431.

The memory 430 has stored sub-word-based sound models, such as models for phonemes or syllables.

The data processing unit 420 includes feature value extracting means 421, sub-word boundary score calculating means 424, temporal regularity analyzing means 422 and voice judging means 423. It should be noted that the feature value extracting means 421, temporal regularity analyzing means 422 and the voice judging means 423 are the same as the feature value extracting means 121, temporal regularity analyzing means 122 and the voice judging means 123 of FIG. 1, respectively.

The sub-word boundary score calculating means 424 refers to the sound models, stored in the voice model storage means 431, and to feature values, extracted by the feature value extracting means 421, to calculate the sub-word boundary score at each time point.

It should be noticed that the functions or processing operations of respective means in the data processing unit 420, that is, the feature value extracting means 421, sub-word boundary score calculating means 424, temporal regularity analyzing means 422 and the voice judging means 423, may also be implemented by a program executed on the data processing unit 420 (computer).

Figure 5:
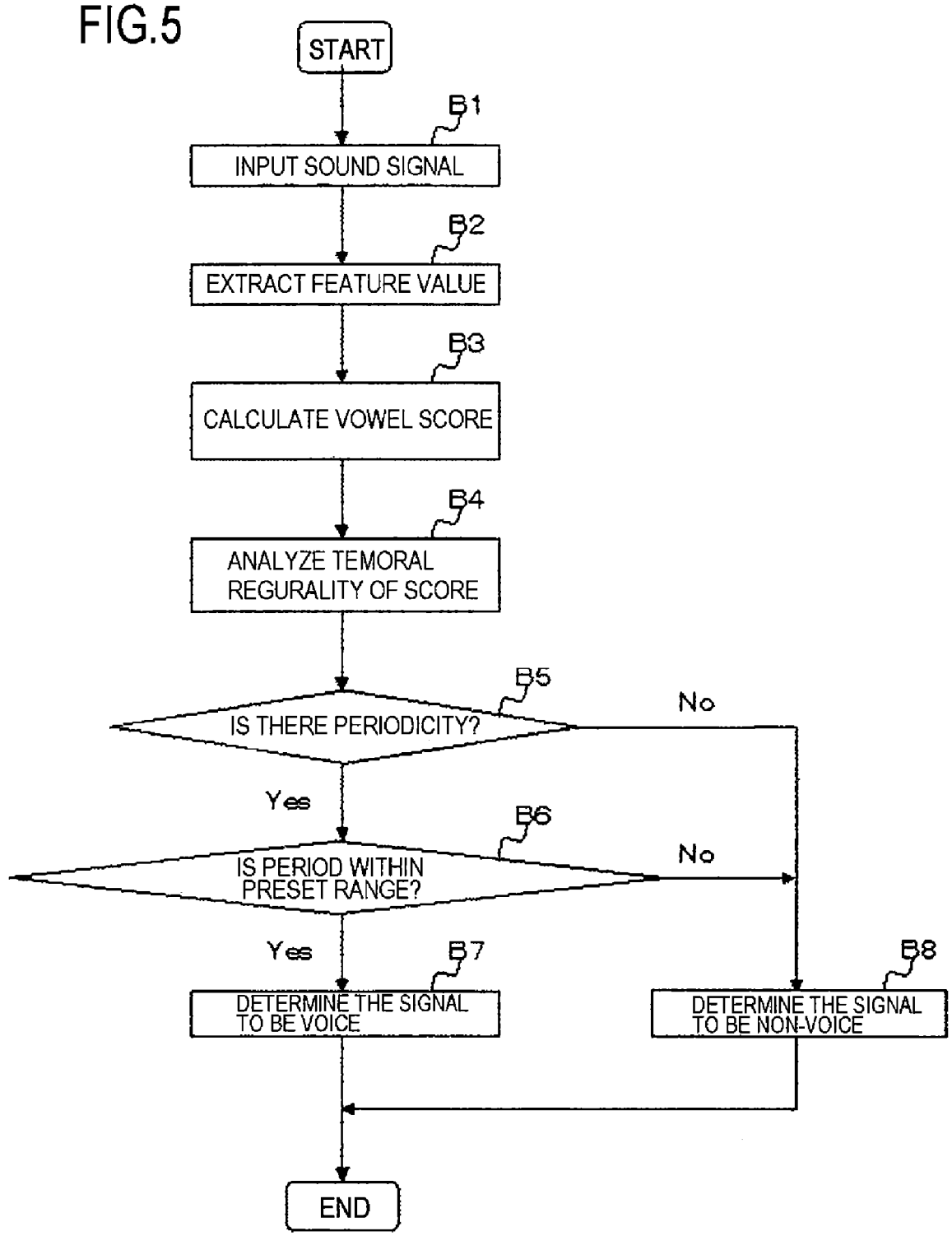
FIG. 5 is a flowchart showing the operation of the second example of the present invention.

FIG. 5 is a flowchart for illustrating the processing sequence of the second example of the present invention. The overall operation of the present example is now described in detail with reference to FIG. 4 and the flowchart of FIG. 5.

In the above-described first example, the time series of the vowel scores in the input sound signal is calculated by the vowel score calculating means 124

The present example differs from the above-described first example in that, instead of calculating the time series of the vowel scores by the vowel score calculating means 124, the time series of the sub-word boundary scores in the input sound signal is calculated by the sub-word boundary score calculating means 424.

The processing contents of the steps B1 and B2 of FIG. 5 are the same as those of the steps A1 and A2 of FIG. 2, while those of the steps B4 to B8 of FIG. 5 are the same as those of the steps A4 to A8 of FIG. 2. Thus, the description for these steps is dispensed with.

Initially, the sound signal is input to the system by the sound signal input means 410, as in the above-described first example. The feature value extracting means 421 analyzes the input sound signal to extract a time series of feature values.

The sub-word boundary score calculating means 424 then refers to the so extracted feature values, and to the sound models stored in the voice model storage means 431, and derives the sub-word boundary scores in the input sound signal (step B3 of FIG. 5).

The sub-word boundary score is a measure indicating whether or not there exists the sub-word based boundary, that is, the boundary between sub-words that make up a voice, such as phonemes or syllables.

That is, the fact that the sub-word boundary score is high at a certain time point indicates that the sound signal in an interval temporally before such time point is a signal close to a certain phoneme or syllable, and that the sound signal in an interval temporally following such time point is a signal close to another phoneme or syllable.

The sub-word boundary score, having the above property, may be derived by the following method with the use of the sub-word-based sound models, such as sound models for phonemes or syllables.

To begin with, the likelihood $P(x\_t|q)$ of the model for each sub-word q for the feature x_t at each time point t is calculated by the sub-word-based sound models, such as sound models for phonemes or syllables, which are stored in the voice model storage means 431.

D(t) which is the sum of squares of time differences of the likelihood values for the totality of the sub-word-based sound models is calculated in accordance with the following equation (2):

$$D(t) = \sum_{q \in S_{all}} (P(x_t|q) - P(x_{t-1}|q))^2 \quad (2)$$

where S_all denotes a set of all phonemes stored in the voice model storage means 431.

As may be seen from the equation (2), D(t) is a quantity representing the magnitude of the change in the likelihood value of each sub-word model at each time point, and hence may be used as the sub-word boundary score.

Specifically, a larger magnitude of D(t) indicates that the sound signal for a sub-word before the time point has changed to the sound signal for another sub-word after the time point.

Here, the sum of the time differences of the likelihood $P(x\_t|q)$ of each sub-word is used as the sub-word boundary score. It is however also possible to obtain the a-posteriori probability $P(q|x\_t)$ of each sub-word and to use the sum of the time differences of the a-posteriori probability as the sub-word boundary score.

The a-posteriori probability of each sub-word may be found by the calculations like those shown by the above equation (1).

By using the time differences of the a-posteriori probability, it is possible to obtain the normalized sub-word boundary scores.

It should be noted that the sub-word species of the sound models stored in the voice model storage means 431 do not need to be the same as the sub-word species for the sub-word boundary scores calculated by the sub-word boundary score calculating means 424. That is, it is also possible for the voice model storage means 431 to store the sound models of phonemes and for the sub-word boundary score calculating means 424 to take only the transitions from the vowels into account in order to calculate boundary scores for syllables, for instance.

The time series of the sub-word boundary scores, calculated as thus far described, may be considered to represent how each time point of the input sound signal is likely to be the boundary of a sub-word, such as a phoneme or a syllable.

Figure 6:
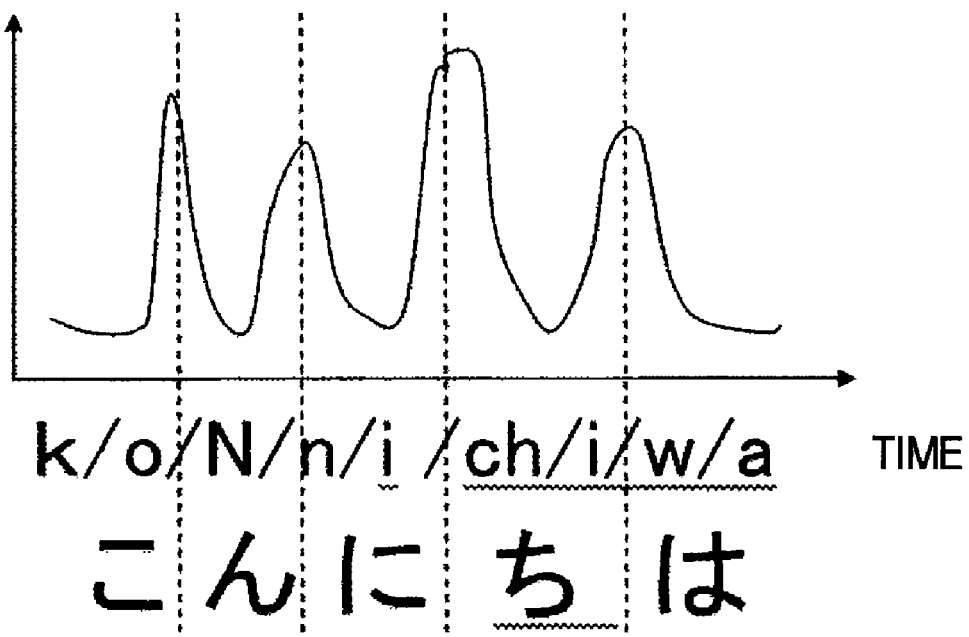
FIG. 6 is a graph schematically showing a time series of syllabic boundary scores for the voice "konnichiwa" in the second example of the present invention.

FIG. 6 is a graph showing a time series of syllabic boundary scores, that is, a time series of the syllabic-boundary-likeness, as found for the voice "konnichiwa" (k/o/N/n/i/ch/i/w/a/). In FIG. 6, the abscissa and the ordinate denote the time and the syllabic boundary scores, respectively. In FIG. 6, a solid line indicates the time series of the syllabic boundary scores, and vertically extending broken lines (dotted lines) each denote a syllabic boundary.

In general, voice has the property that vowels occur periodically at a substantially constant time interval. Thus, the time series of sub-word boundary scores for voice exhibits temporal regularity as shown in FIG. 6.

Conversely, with non-voice, it is only on extremely rare occasions that the signals close to phonemes or syllables occur with temporal regularity. It is therefore only rare that the time series of the sub-word boundary scores for non-voice exhibits temporal regularity.

The temporal regularity analyzing means 422 and the voice judging means 423 act on the time series of the sub-word boundary scores, thus found, in the same way as in the above-described first example, in order to determine whether the input sound signal is voice or non-voice.

The operation and the meritorious effect of the present invention will now be described.

With the present example, the input sound signal is determined to be a voice signal in case the sub-word boundary scores, representing the phonemic- or syllabic-boundary-likeness, exhibit the temporal regularity. The input sound signal is determined to be a non-voice signal in case the sub-word boundary scores, representing the phonemic- or syllabic-boundary-likeness, fails to exhibit the temporal regularity. Hence, the noise that yields the feature close to that of voice on temporally localized analysis may correctly be determined to be non-voice.

As mentioned in the above, a voice signal in general has the property that sub-words, such as phonemes or syllables, occur in an orderly manner at a substantially constant time interval. Conversely, even with a noise, as a non-voice signal, from which will be obtained a feature close to that of voice by temporally localized analysis, it is only on extremely rare occasions that signals similar to phonemes or syllables occur in a temporally regular manner.

With the present example, the presence or non-presence of the temporal regularity of sub-word boundary scores is decided, and the input signal is determined to be a voice signal in case these scores exhibit the temporal regularity. It is thus possible to take up the property which is specific to voice.

Thus, with the present example, even a noise from which a feature close to that of voice will be obtained by localized analysis may correctly be determined to be non-voice.

Figure 7:
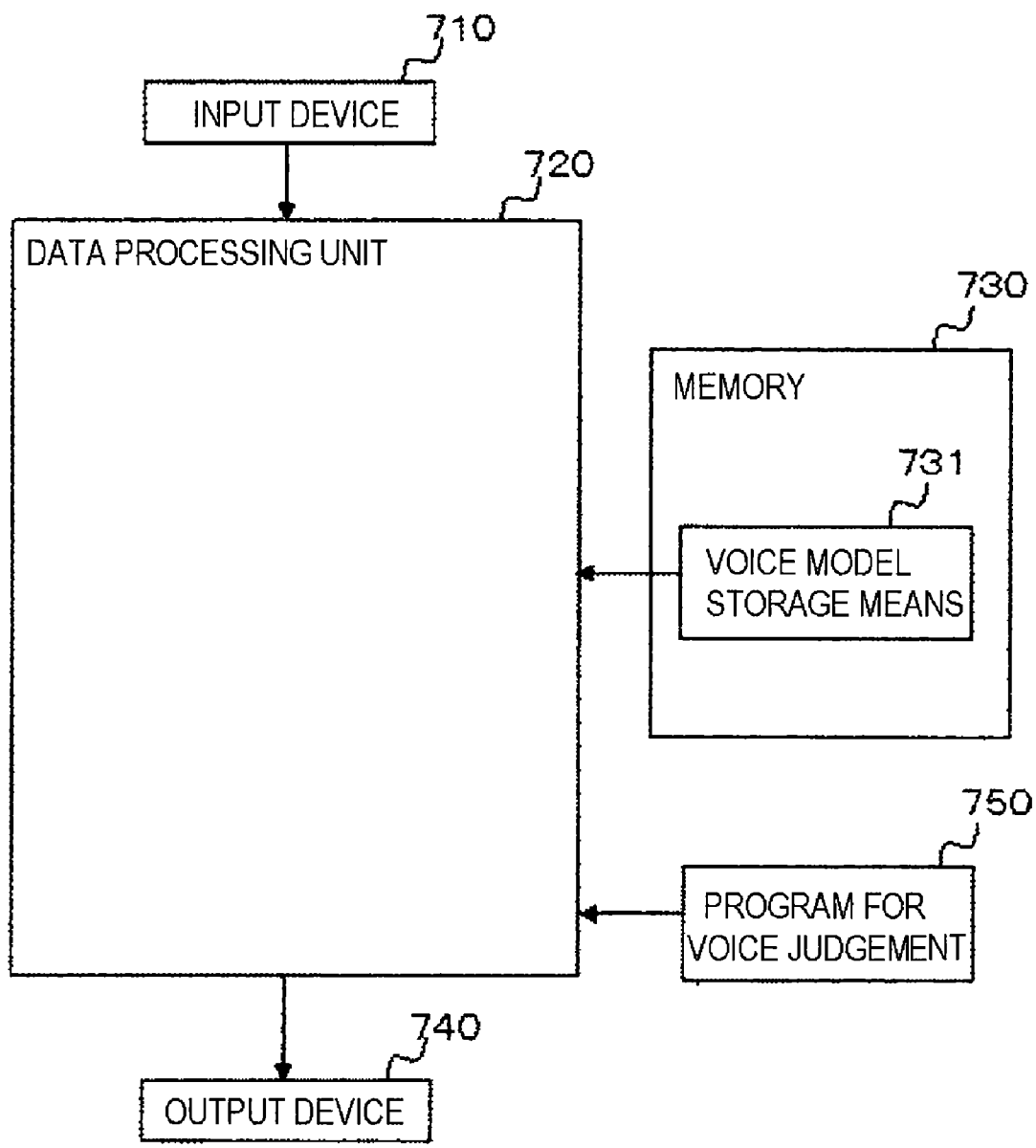
FIG. 7 is a schematic block diagram showing the configuration of a third example of the present invention.
Figure 8:
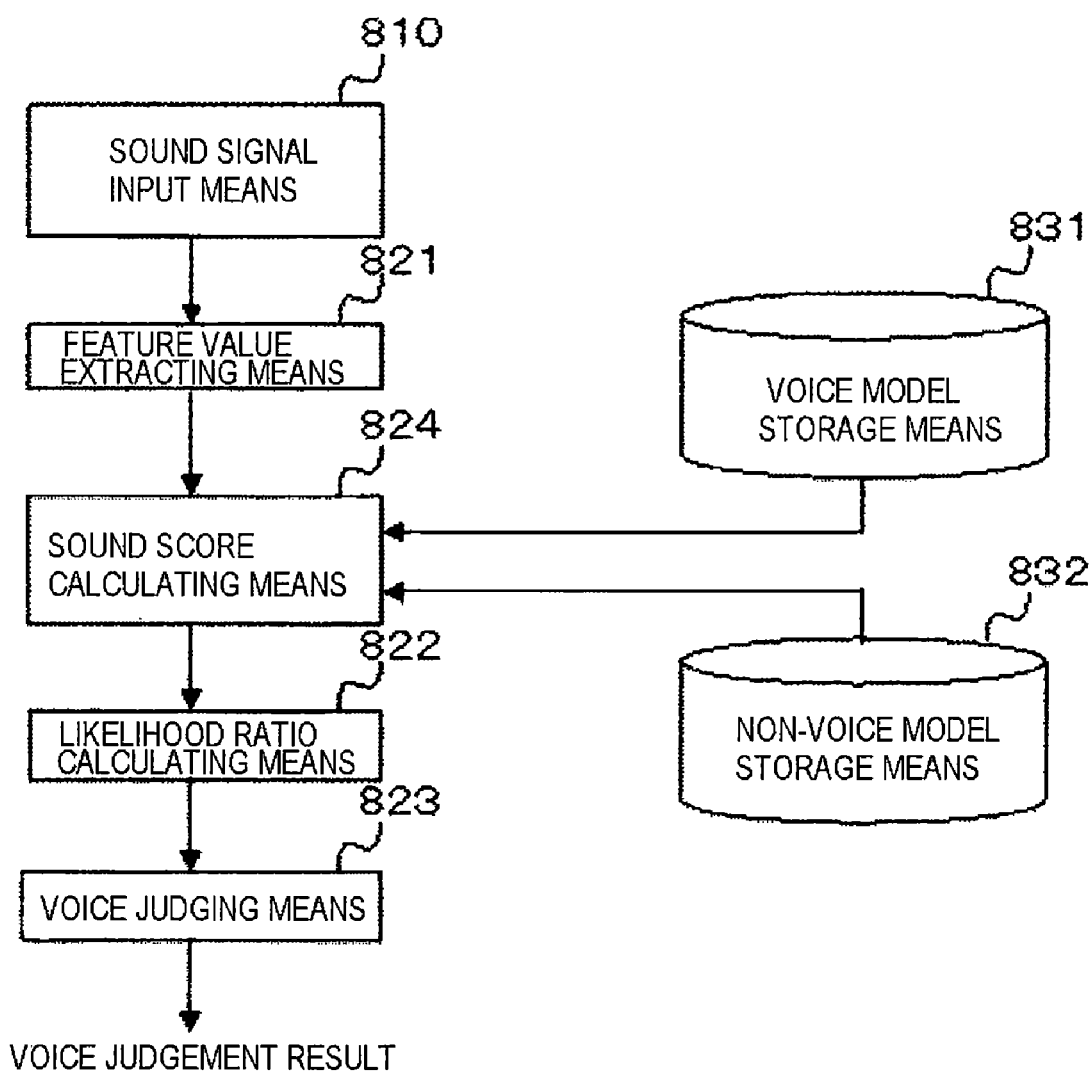
FIG. 8 is a block diagram showing the configuration of a conventional voice judging system.

A third example of the present invention will now be described. FIG. 7 is a block diagram illustrating the configuration of the third example of the present invention. Referring to FIG. 7, the third example of the present invention includes a data processing unit 720, that is operated under program control, an input device 710, a memory 730 and an output device 740.

A program for voice judgment 750 is read-in to the data processing unit 720 from a recording medium or down-loading through a transmission medium. The so read-in program for voice judgment controls the operation of the data processing unit 720 to generate a voice model storage unit 731 in the memory 730.

Under control by the program for voice judgment 750, the data processing unit 720 executes the same processing as that carried out by the data processing unit 120 of the first example or by the data processing unit 420 of the second example.

The present invention may be applied to a variety of uses, including the use as a voice recognition system for discriminating the voice out of a variety of input sound signals, or the use as a program for implementing the voice recognition system on a computer.

Although the present invention has so far been described with reference to preferred examples, the present invention is not to be restricted to the examples. It is to be appreciated that those skilled in the art can change or modify the examples without departing from the spirit and the scope of the present invention.

The invention claimed is:

1. A voice judging system comprising:
   a voice model memory that stores a plurality of sound models of voice;
   vowel score calculating means that calculates vowel scores, representing vowel-likeness, for respective time points of an input sound signal, by having reference to the sound models;
   temporal regularity analyzing means that analyzes temporal periodic regularity of the vowel scores; and
   voice judging means that judges whether the input sound signal is voice or non-voice, based on the temporal periodic regularity of the vowel scores.

2. A voice judging system comprising:
   a voice model memory that stores a plurality of sound models of voice;
   sub-word boundary score calculating means that calculates sub-word boundary scores, representing sub-word-boundary-likeness, for respective time points of an input sound signal, by having reference to the sound models;
   temporal regularity analyzing means that analyzes the temporal periodic regularity of the sub-word boundary scores; and
   voice judging means that judges whether the input sound signal is voice or non-voice, using the temporal periodic regularity of the sub-word boundary scores.

3. A voice judging method comprising:
   calculating vowel scores, representing vowel-likeness, for respective time points of the input sound signal, by having reference to a plurality of sound models stored in a voice model memory;
   analyzing temporal periodic regularity of the vowel scores; and
   judging whether the input sound signal is voice or non-voice, using the temporal periodic regularity of the vowel scores.

4. A voice judging method comprising:
   calculating sub-word boundary scores, representing sub-word-boundary-likeness, for respective time points of the sound input signal, by having reference to a plurality of sound models stored in a voice model memory;
   analyzing the temporal periodic regularity of the sub-word boundary scores; and
   judging whether the input sound signal is voice or non-voice, using the temporal periodic regularity of the sub-word boundary scores.

5. A non-transitory computer-readable medium containing a program that causes a computer to execute:
   a vowel score calculating processing that calculates vowel scores, representing vowel-likeness, for respective time points of an input sound signal, by having reference to a plurality of sound models stored in a voice model memory;
   a temporal regularity analyzing processing that analyzes temporal periodic regularity of the vowel scores; and
   a voice judging processing that judges whether the input sound signal is voice or non-voice, using the temporal periodic regularity of the vowel scores.

6. A non-transitory computer-readable medium containing a program that causes a computer to execute:
   a sub-word boundary score calculating processing that calculates sub-word boundary scores, representing sub-word-boundary-likeness, for respective time points of an input sound signal, by having reference to a plurality of sound models stored in a voice model memory;
   a temporal regularity analyzing processing that analyzes temporal periodic regularity of the sub-word boundary scores; and
   a voice judging processing that judges whether the input sound signal is voice or non-voice, using the temporal periodic regularity of the sub-word boundary scores.

7. A voice judging apparatus comprising:
   means that inputs a sound signal; and
   means that judges whether the input sound signal is voice or non-voice, by analyzing periodicity of the input sound signal, based on linguistic feature of voice to decide whether or not the input sound signal has a property specific to a voice signal in which a variety of sub-words occur one after another with temporal periodic regularity, wherein said means that judges whether the input sound signal is voice or non-voice determines whether or not temporal periodic regularity is present in time series data of vowel scores, representing vowel-likeness, or of sub-word boundary scores, representing sub-word-boundary-likeness, derived from the input sound signal, said deciding means giving a decision that the input sound signal is a voice signal in case of the temporal periodic regularity being present.

8. A voice judging apparatus comprising:
   a memory that at least stores a plurality of sound models for vowels or phonemes inclusive of vowels;
   sound signal input means that inputs a sound signal;
   feature value extracting means that analyzes the input sound signal from said sound signal input means and extracts a time series of feature values;
   vowel score calculating means that calculates, for said time series of feature values extracted by said feature value extracting means, a time series of vowel scores, as a measure for vowel-likeness of the input sound signal, by having reference to a plurality of sound models stored in said memory;

temporal regularity analyzing means that analyzes temporal periodic regularity of the time series of said vowel scores obtained by said vowel score calculating means; and voice judging means that decides whether or not the temporal periodic regularity is present in said time series of vowel scores to judge that the possibility of the input sound signal being voice is high in case the temporal periodic regularity is present, and to judge the input sound signal to be non-voice in case the temporal periodic regularity is not present.

9. The voice judging apparatus according to claim 8, wherein in case said time series is recognized to have temporal regularity, that is, periodicity, said voice judging means determines whether or not said period is within a preset range; said voice judging means judging that the input sound signal is voice in case said period is within said preset range; said voice judging means judging that the input sound signal is non-voice in case said period is not within said preset range.

10. A voice judging apparatus comprising:

a memory that stores a plurality of sound models each for a sub-word constituting a voice;

sound signal input means that inputs a sound signal;

feature value extracting means that analyzes the input sound signal from said sound signal input means and extracts a time series of feature values;

sub-word boundary score calculating means that calculates, for said time series of the feature values extracted by said feature value extracting means, a time series of sub-word boundary scores, as a measure for sub-word-boundary-likeness of the input sound signal, by having reference to the sound models stored in said memory;

temporal regularity analyzing means that analyzes temporal periodic regularity of the time series of sub-word-boundary scores obtained by said sub-word boundary score calculating means; and voice judging means that decides whether or not the temporal periodic regularity is present in said time series of sub-word-boundary scores, to judge that the possibility of the input sound signal being voice is high in case the temporal periodic regularity is present, and to judge the input sound signal to be non-voice in case the temporal periodic regularity is not present.

11. The voice judging apparatus according to claim 10, wherein in case said time series is recognized to have temporal regularity, that is, periodicity, said voice judging means determines whether or not said period is within a preset range; said voice judging means judging that the input sound signal is voice in case said period is within said preset range; said voice judging means judging that the input sound signal is non-voice in case said period is not within said preset range.

* * * * *